3,260,567
PROCESS FOR THE RECOVERY OF SODA ASH FROM WYOMING TRONA
Henry D. Hellmers and James V. Wiseman, Westend, and Chester R. Beam, Richmond, Calif., assignors to Stauffer Chemical Company, a corporation of Delaware
Filed June 14, 1961, Ser. No. 117,112
12 Claims. (Cl. 23—63)

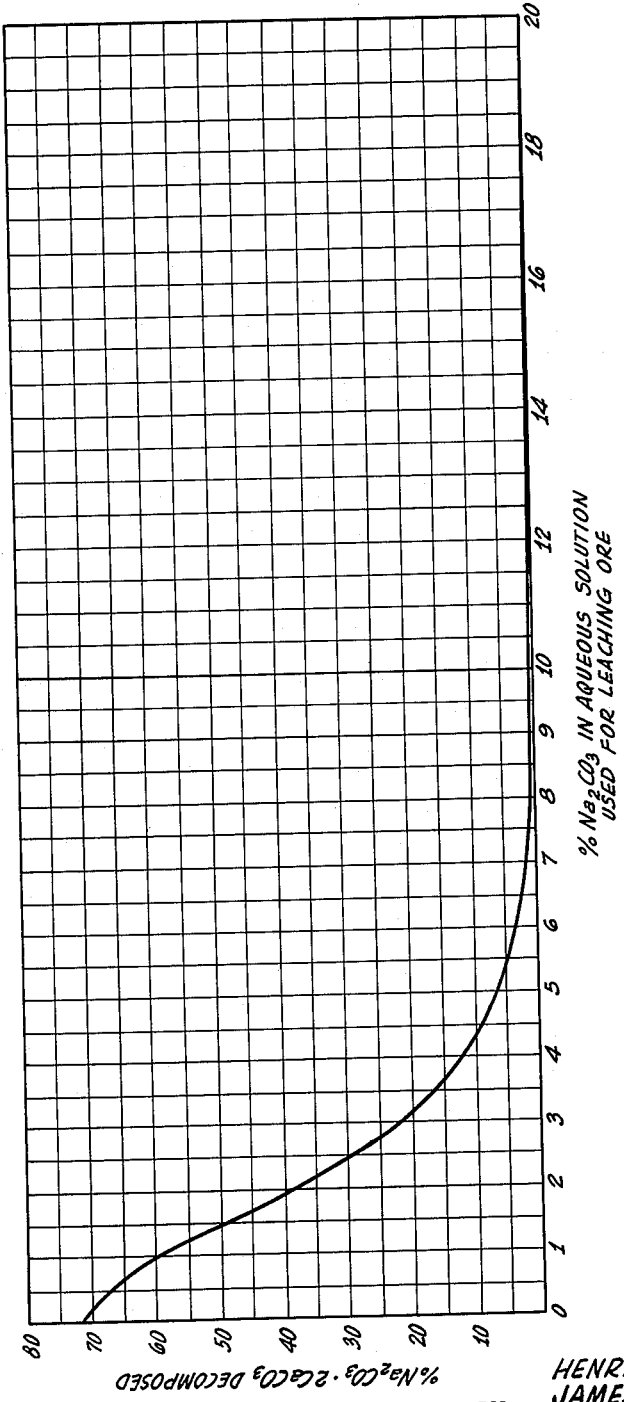

This application is a continuation-in-part of our application Serial No. 86,043, filed January 31, 1961, now abandoned.

This invention relates to the production form Wyoming trona of sodium carbonate monohydrate which is free of organic material.

The trona found in the region of Green River, Wyoming contains a small amount of water insoluble materials including silica and organic matter. To remove moisture and to reduce or eliminate the organic matter, it has been considered necessary, heretofore to calcine the trona to an elevated temperature, e.g. 400° C. and higher. We have discovered that heating to such temperatures is highly undesirable and that preferably one should employ a much lower temperature in the region of 150° C.–200° C. Some of our findings and observations are shown in the following table.

| Temperature, °C. | Solution Color | Carbon Required, Lbs./Ton | Percent $SiO_2$ on Basis of Pure $Na_2CO_3$ |
|---|---|---|---|
| 120 | Very light yellow | 1.5 | 0.03 |
| 150 | do | 1.5 | 0.03 |
| 175 | do | 1.6 | 0.03 |
| 200 | do | 1.2 | 0.03 |
| 230 | Deep brown yellow | 5.4 | 0.03 |
| 260 | Brown yellow | 2.8 | 0.04 |
| 315 | Yellow | 0.4 | 0.04 |
| 370 | Colorless | | 0.05 |
| 450 | do | | 0.06 |
| 480 | do | | 0.12 |
| 650 | do | | 0.39 |

From the above table, it will be apparent that while heating to an elevated temperature on the order of 400° C. and higher will eliminate the organic matter, the quantity of water soluble silica present increases relatively rapidly. The removal of the soluble silica from sodium carbonate brine is a matter attended with some difficulty. It is ordinarily necessary to treat the crude sodium carbonate solution with an adsorbent such as active carbon to render the solution pure and water-white. We have found that the temperature to which the crude trona has been heated fixes the quantity of absorbent required to render the brine clear and water-white. Thus, referring to the column "Carbon required, lbs./ton" in the table, it is to be noted that the carbon requirement is at a maximum when the material has been calcined at about 230° and that as one calcines the material further and at higher temperatures the carbon requirement is reduced and finally none is required. However, as may also be observed from the table, the quantity of soluble silica increases materially as one exceeds a temperature of about 315° C.

We have found that by calcining at a temperature of between about 150° C. and 200° C. we can hold the soluble silica content to a point whereat it is not necessary to bleed off any of the mother liquor from the evaporators as has been heretofore thought necessary. Thus, we are able to process to a final product all of the crude material introduced without having to discard any. All the organic components may not be removed in the first pass through the carbon column. Since these will find their way into the evaporator system and concentrate there, it is desirable to recycle some of the mother liquor from the product filler through the carbon column. This prevents the organic constituents from building up in concentration. The final result is that the monohydrate produced is free of organics and upon drying one obtains a sense soda ash of exceptional quantity.

The time required for calcining the crude trona is relatively short. Material of a fineness of the order of 100 mesh requires only about a minute while coarser material, e.g. ¼" and the like, requires about fifteen minutes.

Although a relatively light carbon treatment is required to remove the color from the crude sodium carbonate solution when one calcines at 150°–200° C. the carbon can thereafter be reactivated by heating to a temperature of 700°–900° C. In this temperature range, the organic components present on the carbon burn to clear odorless products of combustion, thus causing no atmospheric pollution problem.

As a further advantage, we have found that one can successfully use the effluent solution from the carbon decolorizing treatment as a wash for the sodium carbonate monohydrate product. This reduces the fresh water otherwise required; at the same time it improves the economy of the evaporation operation because the total liquid content in the evaporation system is held to a minimum and is not increased with fresh wash water.

Among the impurities present in crude trona is the mineral Shortite, $Na_2CO_3 \cdot 2CaCO_3$. In one ore from the Green River section which we have examined, the Shortite provides approximately half of the water insoluble content of the ore. We have found that if one attempts solution of the crude trona in water or a sodium carbonate solution containing less than about 10% of the sodium carbonate, the Shortite decomposes, the sodium carbonate present going into solution while the calcium carbonate precipitates as a very finely divided material. When this precipitate mixes with the slime-forming constituents present, even in small amounts, the resulting mixture of slimes and precipitated calcium carbonate is extremely difficult to remove and one must provide a very substantial filtering capacity.

To eliminate the possibility of decomposing the Shortite, we therefore preferably bring the crude calcined trona into contact with a solution saturated, or nearly so, with respect to sodium carbonate. The temperature of this solution is preferably relatively high (above about 80° C.) to convert the sodium carbonate to a slurry of sodium carbonate monohydrate in which the Shortite is present as an insoluble solid phase. The monohydrate slurry is diluted sufficiently to dissolve the solid phase sodium carbonate monohydrate and provide a saturated solution of sodium carbonate. Separation of the Shortite from the saturated solution is accomplished under such conditions that the Shortite remains in solid phase and does not dissolve.

Also, because of the low temperature of drying and the conversion of the sodium carbonate to monohydrate, the slimes present are more susceptible to flocculation and settling and the subsequent removal of the slimes by filtration is thereby made easier. The filtered solution is then treated continuously in the carbon column and thereafter the carbon can be recovered and reactivated at relatively low cost for reuse. As has been mentioned, the reactivation is achieved by burning out the organic components present at 700°–900° C. the product's combustion being released to the atmosphere as odorless and colorless gases, thus obviating any atmospheric pollution.

It is in general a broad object of the present invention to provide a novel process for the preparation of crude trona so that a pure dense soda ash may be readily recovered therefrom.

A further object of the present invention is to provide a process in which the problem of organic components present is minimized, enabling the crude sodium carbonate solution to be handled at minimum cost to produce a dense soda ash of an acceptable grade.

The invention includes other objects and features of advantage, some of which, together with the foregoing, will appear hereinafter when the present preferred practice of the invention is set forth.

In the drawings accompanying and forming a part hereof:

FIGURE 2 is a graphical showing of the percentage decomposition of Shortite in aqueous sodium carbonate solutions of dfferent strengths using the increase in calcium carbonate content of the insoluble residue as a measure of the decomposition.

Figure 1:
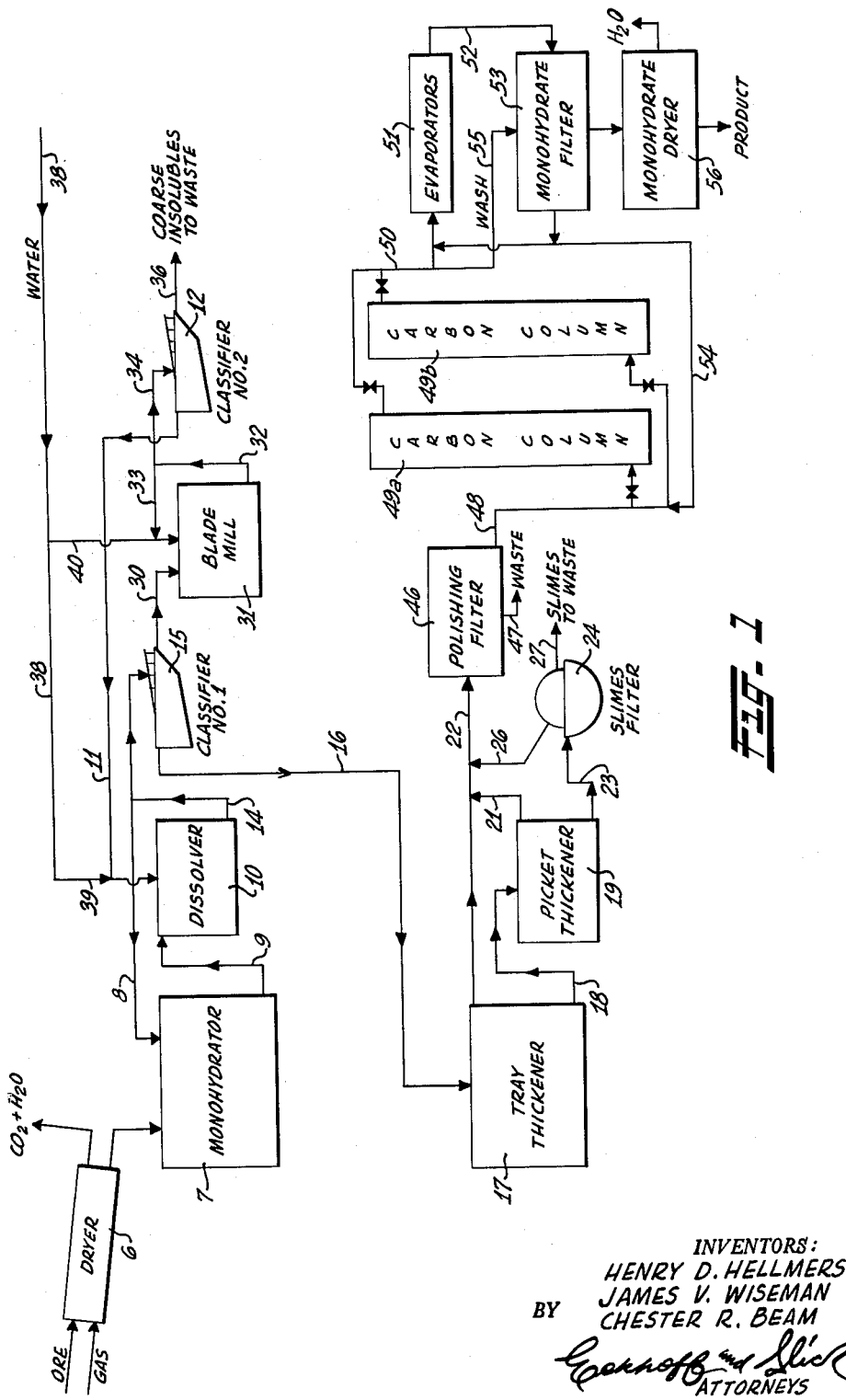
FIGURE 1 is a schematic showing of suitable apparatus and a diagrammatic flow-sheet for carrying out the present invention.

Referring to FIGURE 1, finely ground Wyoming trona ore is fed into a gas-fired dryer 6 wherein the ore is preferably heated, as has been set forth, to a temperature of 150°–200° C. Carbon dioxide and water vapor issue from the dryer and are exhausted to the atmosphere while the hot ore is discharged into a mixing device 7, termed a monohydrator. In this the hot ore is mixed with a saturated solution of the sodium carbonate, this solution being returned through line 8 from the dissolver 10 as will be explained. Enough solution is recycled in the monohydrator to limit the temperature rise to below the boiling point of the solution.

In the monohydrator substantially all of the sodium carbonate in the ore is converted to sodium carbonate monohydrate $Na_2CO_3 \cdot H_2O$, forming a slurry. The monohydrate slurry passes from the monohydrator through line 9 into the dissolver 10, where it is mixed with a solution of sodium carbonate delivered through line 11 from the second classifier 12. Solution of the sodium carbonate in the dissolver 10 is quite rapid, approximately 65% of the monohydrate going into solution forming a saturated solution of sodium carbonate.

The saturated solution issues from the dissolver 10 and passes through line 14, inpart to the classifier 15 and in part through line 8 to the monohydrator. The saturated solution from the classifier 15 is taken through line 16 to a tray thickener 17 wherein the liquid is largely separated from the solids, the latter being removed through line 18 to a picket thickener 19. The liquid overflow from the picket thickener is introduced through line 21 into the exit line 22 from the tray thickener. The solid portion released by the picket thickener is taken through line 23 to the slime filter 24 from which the filtrate is returned to line 22 through line 26, while the slimes are sent to waste through line 27.

The material issuing from the classifier 15 is thereafter treated to recover the sodium carbonate monohydrate present. As a first step in this recovery, the material is sent through line 30 into a blade mill 31 where further mixing occurs and further solution of the monohydrate is effected. Approximately two-thirds of the monohydrate goes into solution in dissolver 10 while the remainder goes into solution in blade mill 31. The effluent from the blade mill issues through line 32, a portion being recycled through line 33 to the mill 31, while the balance is sent through line 34 into a second classifier indicated at 12. Coarse insolubles issuing from this last classifier are sent through line 36 to waste, while the effluent from this classifier is returned through line 11 to dissolver 10. Fresh water is added from line 38 through line 40 into the mill 31 and through line 39 into the dissolver 10.

The thickener overflow from line 22 is sent through a polishing filter 46. The solids from the filter 46 are discharged to waste as at 47 while the filtrate is sent through line 48 to one of the carbon columns 49a or 49b wherein substantially all of the organics present are removed. By suitable valves, one of the columns is used while the other is being regenerated. The effluent from the carbon column is sent in part through line 50 to multiple effect evaporators, generally indicated at 51. The operation of such evaporators to produce sodium carbonate monohydrate from a clear water-white saturated solution of sodium carbonate is well known to those skilled in the art and need not be described further.

The evaporator effluent is sent through line 52 to a filter 53 on which the monohydrate crystals are washed with the carbon column effluent from line 55. The filtrate is returned by line 54 in part to line 48 and thence to the carbon column and in part to line 50, the evaporator inlet line. The wet crystals of sodium carbonate monohydrate are washed, removed from the filter and dried in dryer 56, yielding a dense soda ash of acceptable quality.

The following example illustrates a preferred method of practicing the invention. Trona ore containing 90% trona, 1% water and 9% water insoluble material was ground to ¼″ mesh. The ground ore was passed through the dryer 6 which was maintained at a temperature of 170° C. The calcined ore was then passed into the monohydrator which was maintained at a temperature of 80° C. and which contained a saturated solution of sodium carbonate to form a slurry. This slurry was discharged into the dissolver 10 where the monohydrate was dissolved in a solution contaning 10% sodium carbonate to form a saturated solution of sodium carbonate. Part of the effluent from dissolver 10 is returned through line 8 to monohydrator 7, the remainder going to classifier 15. The volume of effluent sodium carbonate solution fed through line 16 was about balanced by the amount of makeup water introduced through line 38, most of which is admitted directly to blade mill 31 for admixture with monohydrate.

The stream entering tray thickener 17 was freed of substantially all slime and solids. The overflow, a saturated solution, was sent on through the clarifying filters 19 and 46 and then to one of the carbon columns 49a or 49b where it was brought into contact with activated carbon. The effluent was then sent to evaporators 51, and the sodium carbonate monohydrate crystals recovered therefrom were washed and calcined to a dense ash of good quality.

Throughout the above operation, the insoluble solid phase is always in contact with an aqueous phase containing more than 10% sodium carbonate. Thus in the foregoing example, the solution added to dissolver 10 from lines 11 and 39 contained at least 10% sodium carbonate, as did that added from lines 33 and 40 to the blade mill. The desirability of this will become apparent when one studies the graphical showing of the relationship between the percentage decomposition of Shortite and the sodium carbonate content of the aqueous phase as given in FIGURE 2. This determination was made by holding a 3% suspension of Shortite for an hour at 85°–90° C. in several sodium carbonate solutions, each of a different concentration. The increase of CaO in the insoluble residue was determined and related to the percentage decomposition. It will be observed from this study that one should employ always a solution of sodium carbonate containing more than 10% sodium carbonate to avoid and minimize Shortite decomposition.

In summation, we would point out that calcining of the crude trona to produce crude sodium carbonate is useful irrespective of its subsequent treatment. Thus by observing the temperature limits of 150°–200° C., one is able to reduce the content of soluble silica and simultaneously reduce the problem provided by the organic constituents present. The steps of mixing a crude sodium carbonate with a substantially saturated solution of sodium carbonate to form a slurry of sodium carbonate monohydrate and gangue solids or material and thereafter mixing the sodium carbonate monohydrate slurry with a sodium carbonate solution containing at least 10% sodium carbonate to dissolve the sodium carbonate monohydrate and form a substantially saturated solution of sodium carbonate are steps which also possess great advantage and this irrespective of the temperature at which the trona has been heated previously to produce the crude sodium carbonate. When all of these steps are combined, then one is provided with an overall process which includes all the features and advantages.

We claim:
1. In a process for preparing a clear solution of sodium carbonate from crude trona, the steps comprising crushing the crude trona, calcining the crude trona at a temperature between about 150° C. and below about 200° C. to crude sodium carbonate, mixing the crude sodium carbonate with a substantially saturated solution of sodium carbonate to form a slurry of sodium carbonate monohydrate and gangue material, and diluting the sodium carbonate monohydrate slurry to dissolve the sodium carbonate monohydrate and form a substantially saturated solution of sodium carbonate.

2. In a process for preparing a clear solution of sodium carbonate from crude trona, the steps comprising crushing the crude trona, calcining the crude trona at a temperature between about 150° C. and below about 200° C. to crude sodium carbonate, mixing the heated crude sodium carbonate with a substantially saturated solution of sodium carbonate to form a slurry of sodium carbonate monohydrate and gangue solids, diluting the sodium carbonate monohydrate slurry to dissolve the sodium carbonate monohydrate and form a saturated solution of sodium carbonate, and separating gangue solids from the saturated solution of sodium carbonate.

3. In a process for preparing a clear solution of sodium carbonate from crude trona, the steps comprising crushing the crude trona, calcining the crude trona at a temperature between about 150° C. and below about 200° C. to crude sodium carbonate, mixing the crude sodium carbonate with a substantially saturated solution of sodium carbonate to form a slurry of sodium carbonatae monohydrate and gangue solids, and diluting the sodium carbonate monohydrate slurry with a solution of sodium carbonate containing in excess of 10% sodium carbonate to dissolve the sodium carbonate monohydrate and form a substantially saturated solution of sodium carbonate.

4. In a process for preparing a clear solution of sodium carbonate from crude trona, the steps comprising crushing the crude trona, calcining the crude trona at a temperature between about 150° C. and below about 200° C. to crude sodium carbonate, mixing the crude sodium carbonate with a saturated solution of sodium carbonate to form a slurry of sodium carbonate monohydrate and gangue material, dissolving the monohydrate in a solution containing at least 10% sodium carbonate to form a substantially saturated solution of sodium carbonate, separating said saturated solution of sodium carbonate from the gangue solids, and mixing part of said saturated solution of sodium carbonate with fresh additional slurry of sodium carbonate monohydrate and gangue solids.

5. In a process for preparing a clear solution of sodium carbonate from crude trona, the steps comprising crushing the crude trona, calcining the crude trona at a temperature between about 150° C. and below about 200° C. to crude sodium carbonate, mixing the calcined crude sodium carbonate with a substantially saturated solution of sodium carbonate to form a slurry of sodium carbonate monohydrate and gangue material, diluting the sodium carbonate monohydrate slurry with a sodium carbonate solution containing at least 10% sodium carbonate to dissolve the sodium carbonate monohydrate and form a substantially saturated solution of sodium carbonate, filtering said substantially saturated solution, passing the filtered solution through a mass of an adsorbent to remove organic coloring matter and provide a solution substantially saturated with sodium carbonate, evaporating said solution to produce an effluent stream containing sodium carbonate monohydrate crystals substantially free from organic matter, filtering the effluent stream to remove said crystals and provide a filtrate, and recycling at least a portion of the filtrate through the mass of the adsorbent.

6. In a process for preparing a clear solution of sodium carbonate from crude trona, the steps comprising crushing the crude trona, calcining the crude trona at a temperature between about 150° C. and below about 200° C. to form crude sodium carbonate, mixing the crude sodium carbonate with a saturated solution of sodium carbonate to form a slurry of sodium carbonate monohydrate, diluting the sodium carbonate monohydrate with a solution of sodium carbonate containing at least 10% sodium carbonate to form a substantially saturated solution of sodium carbonate, separating said substantially saturated solution from the gangue solids, filtering said substantially saturated solution, passing the filtered saturated solution through a mass of an adsorbent to remove organic coloring matter and provide a clear solution saturated with sodium carbonate, evaporating said clear water-white solution to produce an effluent stream containing sodium carbonate monohydrate crystals, filtering the effluent stream to remove said crystals and provide a filtrate, washing said crystals with a portion of said clear solution, and recycling at least a portion of the filtrate to pass through the mass of the adsorbent.

7. In a process for preparing a clear solution of sodium carbonate from crude trona, the steps comprising crushing the crude trona, calcining the crude trona at a temperature between about 150° C. and below about 200° C. to form crude sodium carbonate, mixing the crude sodium carbonate with a substantially saturated solution of sodium carbonate to form a slurry of sodium carbonate monohydrate and undissolved solids, diluting the sodium carbonate monohydrate slurry to dissolve the sodium carbonate monohydrate and form a saturated solution of sodium carbonate, filtering said saturated solution, and passing the filtered saturated solution through a mass of an adsorbent to remove organic coloring matter and provide a clear solution saturated with sodium carbonate.

8. In a process for preparing a clear solution of sodium carbonate from crude trona, the steps comprising crushing the crude trona, calcining the crude trona at a temperature between about 150° C. and below about 200° C. to form heated crude sodium carbonate, mixing the heated crude sodium carbonate with a saturated solution of sodium carbonate to form a slurry of sodium carbonate monohydrate and gangue solids, diluting the sodium carbonate monohydrate slurry to dissolve the sodium carbonate monohydrate and form a substantially saturated solution of sodium carbonate containing the slime constituents present in the crude trona, separating the gangue solids from the substantially saturated solution of sodium carbonate solution, treating said substantially saturated solution to remove the slimes, and then removing organic coloring constituents present with an adsorbent to provide a clear saturated solution of sodium carbonate.

9. In a process for preparing a clear solution of sodium carbonate from crude trona, the steps comprising crushing the crude trona, calcining the crude trona to crude sodium carbonate, mixing the crude sodium carbonate with a substantially saturated solution of sodium carbonate to form a slurry of sodium carbonate monohydrate and gangue material and diluting the sodium carbonate monohydrate slurry to dissolve the sodium carbonate monohydrate and form a substantially saturated solution of sodium carbonate.

10. In a process for preparing a clear solution of sodium carbonate from crude trona, the steps comprising crushing the crude trona, calcining the crude trona to form crude sodium carbonate, mixing the crude sodium carbonate with a substantially saturated solution of sodium carbonate to form a slurry of sodium carbonate monohydrate and undissolved solids, diluting the sodium carbonate monohydrate slurry to dissolve the sodium carbonate monohydrate and form a saturated solution of sodium carbonate, filtering said saturated solution, and passing the filtered saturated solution through a mass of an adsorbent to remove organic coloring matter and provide a clear solution of sodium carbonate.

11. The process of claim 10 wherein the adsorbent is reactivated by heating the adsorbent to a temperature of from 700°–900° C. to form clear, odorless products of combustion.

12. A process for the preparation of purified sodium carbonate from crude trona which comprises crushing the crude trona, calcining the crude trona to crude sodium carbonate, adding the crude sodium carbonate to a saturated aqueous solution of sodium carbonate to form sodium carbonate monohydrate and insoluble impurities, and separating the impurities from the sodium carbonate monohydrate.

References Cited by the Examiner
UNITED STATES PATENTS

| | | | |
|---|---|---|---|
| 2,346,140 | 4/1944 | Pike | 23—63 |
| 2,792,282 | 5/1957 | Pike | 23—38 |
| 2,962,348 | 11/1960 | Seglin | 23—31 |
| 2,989,369 | 6/1961 | Osborne | 23—63 X |
| 3,131,996 | 5/1964 | Seglin et al. | 23—63 |

OSCAR R. VERTIZ, *Primary Examiner.*

GEORGE D. MITCHELL, MAURICE A. BRINDISI,
*Examiners.*

E. C. ZIEHM, A. J. STEWART, G. OZAKI
*Assistant Examiners.*